United States Patent
Genestier et al.

(10) Patent No.: US 9,692,754 B2
(45) Date of Patent: Jun. 27, 2017

(54) ENSURING THE SECURITY OF A DATA TRANSMISSION

(71) Applicants: ORANGE, Paris (FR); MORPHO, Issy les Moulineaux (FR)

(72) Inventors: Philippe Genestier, Hurtieres (FR); Jerome Moreau, Paris (FR); Louis-Philippe Goncalves, Paris (FR); Bruno Benteo, Paris (FR)

(73) Assignees: Orange, Paris (FR); Morpho, Issy-les-Moulineaux (FR)

( * ) Notice: Subject to any disclaimer, the term of this patent is extended or adjusted under 35 U.S.C. 154(b) by 0 days.

(21) Appl. No.: 14/377,717

(22) PCT Filed: Feb. 1, 2013

(86) PCT No.: PCT/FR2013/050218
§ 371 (c)(1),
(2) Date: Aug. 8, 2014

(87) PCT Pub. No.: WO2013/121127
PCT Pub. Date: Aug. 22, 2013

(65) Prior Publication Data
US 2015/0312251 A1    Oct. 29, 2015

(30) Foreign Application Priority Data

Feb. 16, 2012  (FR) .................................. 12 51438
Sep. 28, 2012  (FR) .................................. 12 59235

(51) Int. Cl.
*G06F 7/04*     (2006.01)
*H04L 9/32*    (2006.01)
(Continued)

(52) U.S. Cl.
CPC .......... *H04L 63/0853* (2013.01); *G06F 21/31* (2013.01); *G06F 21/62* (2013.01);
(Continued)

(58) Field of Classification Search
CPC ... H04L 63/0853; H04L 63/08; H04L 63/123; H04L 63/0861; G06F 21/31; G06F 21/62;
(Continued)

(56) References Cited

U.S. PATENT DOCUMENTS

2002/0053035 A1    5/2002  Schutzer
2004/0005912 A1*   1/2004  Hubbe .................. H04W 88/02
                                                                  455/558

(Continued)

FOREIGN PATENT DOCUMENTS

FR    2 987 529 A1    8/2013

OTHER PUBLICATIONS

Khachtchanski et al., "Universal SIM toolkit-based client for mobile authorization system," International Conference on Information Integration and Web-Based Applications and Services, pp. 337-344 (Sep. 10, 2001).

(Continued)

*Primary Examiner* — Aravind Moorthy
(74) *Attorney, Agent, or Firm* — Drinker Biddle & Reath LLP (57) ABSTRACT

Ensuring the security of a data transmission by verifying an identity of a user, comprising: a prior step of enrolling a terminal of the user, comprising: an association of a authentic identity data item of the user and a data item of a terminal available to the user and communicating via a network, the association being stored with data for contacting the terminal via the network, and a determination of an identity derived from at least said information, stored in the memory of the terminal, in correspondence with a data item specific to the user, for the purposes of a later strong authentication based on both the data item specific to the user and on the derived identity, as well as a current step of verifying the user identity.

22 Claims, 3 Drawing Sheets

(51) Int. Cl.
 H04L 29/06 (2006.01)
 G06Q 20/32 (2012.01)
 G06Q 20/40 (2012.01)
 G06F 21/62 (2013.01)
 G06F 21/31 (2013.01)
(52) U.S. Cl.
 CPC ..... *G06Q 20/3229* (2013.01); *G06Q 20/4014* (2013.01); *H04L 63/08* (2013.01); *H04L 63/123* (2013.01); *H04L 63/0861* (2013.01)
(58) Field of Classification Search
 CPC ............ G06Q 20/322; G06Q 20/3229; G06Q 20/0414
 USPC .................. 726/7, 4, 9, 20; 713/168, 172
 See application file for complete search history.

(56) References Cited

U.S. PATENT DOCUMENTS

| | | |
|---|---|---|
| 2005/0235148 A1 | 10/2005 | Scheidt et al. |
| 2006/0191995 A1 | 8/2006 | Stewart et al. |
| 2007/0162766 A1* | 7/2007 | Watanabe ........... G06F 21/6218 713/193 |
| 2012/0003957 A1* | 1/2012 | Agevik ................. H04L 63/126 455/410 |
| 2014/0250517 A1* | 9/2014 | Kim ..................... H04L 9/3228 726/7 |
| 2015/0038118 A1 | 2/2015 | Berteau et al. |
| 2015/0044999 A1* | 2/2015 | Haberkorn ............. H04W 4/12 455/411 |

OTHER PUBLICATIONS

SIM Alliance, "Secure Authentication for Mobile Internet Services," retrieved from Internet website: http://www.idc-informatigue.fr/SecureAuthenticationFinal.pdf?PHPSESSID=03ef7d91d6629f98d30195f412fada93, pp. 1-24 (Dec. 31, 2011).

Examination Report issued in corresponding application EP 13706616.3, Feb. 21, 2017, 8 pages.

* cited by examiner

ENSURING THE SECURITY OF A DATA TRANSMISSION

CROSS-REFERENCE TO RELATED APPLICATIONS

This application is the U.S. national phase of the International Patent Application No. PCT/FR2013/050218 filed Feb. 1, 2013, which claims the benefit of French Application No. 12 51438 filed Feb. 16, 2012, and the benefit of French Application No. 12 59235 filed Sep. 28, 2012, the entire disclosures of which are incorporated herein by reference.

FIELD

The invention relates to ensuring the security of a data transmission by verifying the identity of a user, particularly in order to access a service.

BACKGROUND

For example, this service may concern access to bank data or to data in medical records, or some other access. Generally, the access is authorized after verification of a medium that comprises a security processor for example, such as a smart card (a debit card for example). However, verifying the medium requires a reader each time access to the service is requested. For example, the SESAM-Vitale card (defining rights to health insurance in France) requires a reader (for example in the form of a read terminal connected to a central server) so that a user can view his rights to health care access or update the medical records of the cardholder.

In spite of the efforts made in deploying these terminals, they are not always easily accessible, particularly during emergencies or when abroad.

Note also that such readers need to be available to healthcare professionals, for accessing patient medical records during a consultation. The healthcare professionals themselves have another professional card in France (the CPS: "Carte Professionnel de Santé" or Healthcare Professional Card) which requires the use of another reader to read it.

Such an organization duplicates the card readers thus must be available to healthcare providers in their work environment. In addition, usage when abroad or the use of terminals that do not have a card reader interface are not possible.

SUMMARY

The invention aims to improve the situation.

For this purpose, it proposes a method for verifying an identity of a user, comprising:
a prior step of enrolling a terminal of the user, comprising the storing of an identity derived from at least one authentic identity data item of the user, in storage means of the terminal, in correspondence with a data item specific to the user, and
a current step of verifying the identity of the user at the terminal, comprising a strong authentication based on the stored derived identity and on the stored data item specific to the user.

An "authentic identity data item of the user" is understood to mean an element of information about the identity of the user carried on an identity medium. It may, for example, come from a personal card containing a security processor (for example a bank card, or more generally a smart card providing access to rights, such as a SESAM-Vitale card which in France gives rights to healthcare). As a variant, this can be a proof of identity (passport, possibly biometric, or other proof). The authentic identity of the user can be the user's government-recognized identity. As will be seen in an example embodiment described below, it is preferable but optional that a reader of this smart card or of this proof of identity (read terminal) reads, verifies, and communicates the user identity information that the card or proof of identity contains.

A strong authentication of the above type guarantees robustness in the user identity verification, as will be seen below.

In one embodiment, the prior enrollment step comprises a determination of the derived identity by combining.
the authentic identity data item of the user, and
a terminal data item.

In particular, in one embodiment this association can be stored with data for contacting the terminal via a network to which the terminal is connected.

In one embodiment, the current verification step comprises:
a verification of consistency between the stored data item specific to the user and a data item specific to the user entered by the user by means of the terminal, and
a transmission of the derived identity stored in the terminal to a remote verification entity.

In one example embodiment, this can make use of a verification based on a comparison of a data item entered by the user and the data item specific to the user, then, if this verification is successful, on a verification of the derived identity made possible by the prior enrollment of the terminal.

In such an embodiment, the current step of verifying the identity of the user comprises, for example:
using the data for contacting the terminal via a network to which the terminal is connected, a contacting of the terminal via this network to cause the terminal to ask the user to enter a data item specific to the user,
a verification by the terminal of the entered data item,
and, if the verification of the entered data item specific to the user is positive, a verification of the derived identity,
and, if the verification of the derived identity is positive, a validation of the verification of the user identity.

"Terminal data item" is understood to mean any type of data which allows identifying the terminal. For example, in the case where the terminal is equipped with a security element such as a SIM ("Subscriber Identity Module") card for example, this data can be an identifier of the SIM card.

"Data for contacting the terminal" and "contact data for the terminal" are understood to mean data which allow reaching the terminal via said network. It may simply be the telephone number (specifically the MSISDN—Mobile Station International Subscriber Directory Number) assigned to the terminal, if the terminal is a telephone terminal (mobile telephone, smart phone, tablet, or other). As a variant, it may for example be an IP address for a device connected via an IP (Internet Protocol) network, or an email address.

One will note that, in the case where the contact data for the terminal are not intended to change, for example the telephone number of a terminal, the contact data for the terminal can indicate the terminal and can simply correspond to said terminal data item.

"Derived" identity is understood to mean an identity data item resulting from any conversion of the identity information stored on the medium initially used to produce the user identity (for example his government-recognized identity), for example a conversion by hash function (for example not interpretable by third parties) or some other conversion.

"Data item specific to the user" is understood to mean, for example, a personal identification number (or "PIN" code), or biometric identification data (voice or fingerprint or iris recognition, etc.), or any other information enabling the identification of the user by a user interface of the terminal.

In one embodiment, a possible implementation of the invention can consist of a method for verifying an identity of a user, including a prior step of enrolling a terminal of the user, comprising:
  an association between:
    an authentic data item of information on the identity of the user, and
    a terminal data item, this terminal being available to the user and communicating via a network,
    this association being stored with data for contacting the terminal via the network,
  a determination of an identity derived from at least said information, and a storing of said derived identity in storage means of the terminal, in correspondence with a data item specific to the user, for the purposes of a later strong authentication based on both the data item specific to the user and on the derived identity.

For example, in a simple embodiment, said terminal data item may correspond directly to said contact data for the terminal.

Then the method can next comprise a current step of verifying the identity of the user, comprising:
  using the contact data for the terminal, a contacting of the terminal via the network to cause the terminal to ask the user to enter said data item specific to the user, as well as a verification of said data item specific to the user by the terminal,
  if the verification of the data item specific to the user is positive, a verification of the derived identity,
  and, if the verification of the derived identity is positive, a validation of the verification of the user identity.

In general, the invention advantageously allows offloading the function of authenticating the user identity (usually based on a bank card, SESAM-Vitale card, etc.) to his terminal, and does so by means of the derived identity stored on the terminal and a strong authentication based on both the verification of the user code and the verification of this derived identity. Applying the invention then makes it possible to use a simple communicating terminal (cell phone, smart phone, tablet, or other) to access one or more distinct services requiring a secure transmission of data (data from medical records, bank data, or other data).

For example, the validity of the user identity verification resulting from said current step can determine whether to issue a session key or encryption key for a later secure data transmission, particularly in the context of a service. For example, this can be a key derived at each service access authorization, after verification of the user identity in the sense of said current step.

In one embodiment, the derived identity is stored in storage means protected by secure access, typically in storage means of a security element of the terminal, such as the storage means of the SIM card for example.

Storing an association can be implemented in an association module, remote from the terminal (for example on a remote server of a service platform). Thus, in one embodiment, this association module can determine the derived identity (derived for example by calculating a hash of the original identity information) and communicate this derived identity to the terminal.

In one embodiment, the derived identity can be sent to the terminal by an OTA (Over The Air) technique together with data of an application running on the terminal in order to at least control the storing of the derived identity. When executed, the application installed on the terminal can therefore result in:
  storing the derived identity on the terminal,
  causing a user interface to ask the user to enter a user data item specific to the user for a future strong authentication,
  later on, during a current step, asking the user to enter his own data item, verifying this data item on the terminal, and, for example, sending the derived identity to a remote module (for verification at this remote module) if the entered data item is valid.

Thus, during said current step, the derived identity can be sent from the terminal to a verification entity remote from the terminal, the verification of the derived identity being validated at said remote entity if the data item specific to the user was also verified successfully by the terminal. Thus the verification at this entity is based on strong authentication, using both the user data item and the derived identity.

Advantageously, this remote entity can comprise at least an authentication module, cooperating with at least said association module to verify the derived identity received from the terminal during the current step.

During the prior step of enrolling the terminal, the derived identity can be determined at the association module, then sent to the terminal via, for example, the platform of a provider of said network.

Initially, the authentic identity data item of the user can be provided by reading a security component (such as a security processor for example) of a medium available to the user (a smart card such as a bank card, a SESAM-Vitale card, or other). The validity of the identity information carried on the card can thus be ensured by the reader and possibly by a remote verification server, before proceeding with associating it with a terminal data item.

As indicated above, in one example embodiment the terminal can be a telecommunications terminal and the contact data for the terminal then contain a number for calling the terminal via said network.

Thus, in one particular embodiment,
  during said prior step:
    the terminal sends to an association module, remote from the terminal, a terminal data item with the authentic identity data item of the user,
    the association module determines a derived identity, and communicates said derived identity to the terminal,
    upon receipt of the derived identity, the terminal executes an application:
      to store the derived identity, and
      to present an interface to the user, for registering a data item specific to the user,
  during said current step:
    on a device connected for a secure data transmission, the device asks the user for contact data for the terminal via a user interface of the connected device, and the device sends said contact data to a verification entity that is remote from the terminal,
    the remote verification entity contacts the terminal in order to launch an application on the terminal, initiating operations:

asking the user to enter the data item specific to the user via a user interface of the terminal, and if the verification of the data item specific to the user is positive, sending the derived identity from the terminal to the verification entity, in case of successful verification of the derived identity at the verification entity, the verification entity validates the verification of the user identity in order to authorize a data transmission via the connected device.

Said presentation of an interface to the user, for entering the data item specific to the user, may consist for example of presenting a code that the user must remember, or asking the user to enter a personal code or to provide a biometric parameter.

The connected device may, for example, be a computer, a tablet, or other device, connected to a service platform via a wide-area network and requesting access to the service, or may be the terminal itself. Thus, as the interaction between the device and a service platform progresses, in one step the user is asked to enter the telephone number of his terminal. The service platform then contacts the terminal in order to launch the strong authentication (for example verification of the code at the terminal, then of the derived identity).

Beforehand, in order to verify the initial user identity information, it can be arranged so that during said prior step:

the association module verifies said identity information with an identity management module (for example a server that manages SESAM-Vitale cards), and if the verification is positive, the association module determines a derived identity and communicates said derived identity to the terminal.

In one embodiment, an identifier is sent with data for contacting the terminal via a network, to a service platform. If the identity verification is positive in the current step, the user is thus authorized to access informational data as a function of said identifier.

It may be advantageous, particularly in an application as described below, to have the terminal receive, by interaction with a communicating object, service access data encoding this identifier.

This communicating object can be a second terminal available to a second user, and able to communicate with the first terminal enrolled during the prior step.

Moreover, the informational data may contain at least data specific to a user of said communicating object.

In one embodiment, the identifier can be sent to a service platform, and this service platform verifies the identifier and authorizes an access to the informational data if the verification of the identifier is successful.

Such an embodiment has advantageous applications, particularly when providing assistance to a person requiring emergency care, in which case the communicating object can be a second terminal available to a second person (requiring emergency care) and able to communicate with the first terminal enrolled during said prior step (provided for example to emergency medical personnel).

In this embodiment, the first terminal can receive the service data from the second terminal by near field communication, the second terminal belonging to a person requiring emergency care (and unable, for example, to identify himself to his telephone or more generally to use a telephone to communicate said service data), and the first terminal belonging to an emergency medical responder.

In such an application, the informational data, which are a function of the service identifier, can at least contain medical data for the person requiring emergency care. The identifier related to a service can then be sent to a service platform. This service platform verifies the identifier and only authorizes sending informational data if the verification of the service identifier is positive.

The invention also relates to a method for ensuring the security of a data transmission between a service platform and a device, comprising a verification of the identity of a user of the device according to the current step of the above method, the method for ensuring the security comprising:

a sending of contact data for the terminal to the service platform, the execution of the current step of identity verification, from the terminal of the user, and if the identity verification is positive, a step authorizing a data transmission between the device and the service platform.

The device can be the terminal itself. It can, for example, be a computer connected to a wide-area network such as the Internet. For example in this case, the IP address of the computer can form the contact data for the terminal.

Moreover, the transmission of data between the device and the service platform can be encrypted, in combination with the allocation of a session key or encryption in the communication between the device and the platform.

Figure 1:
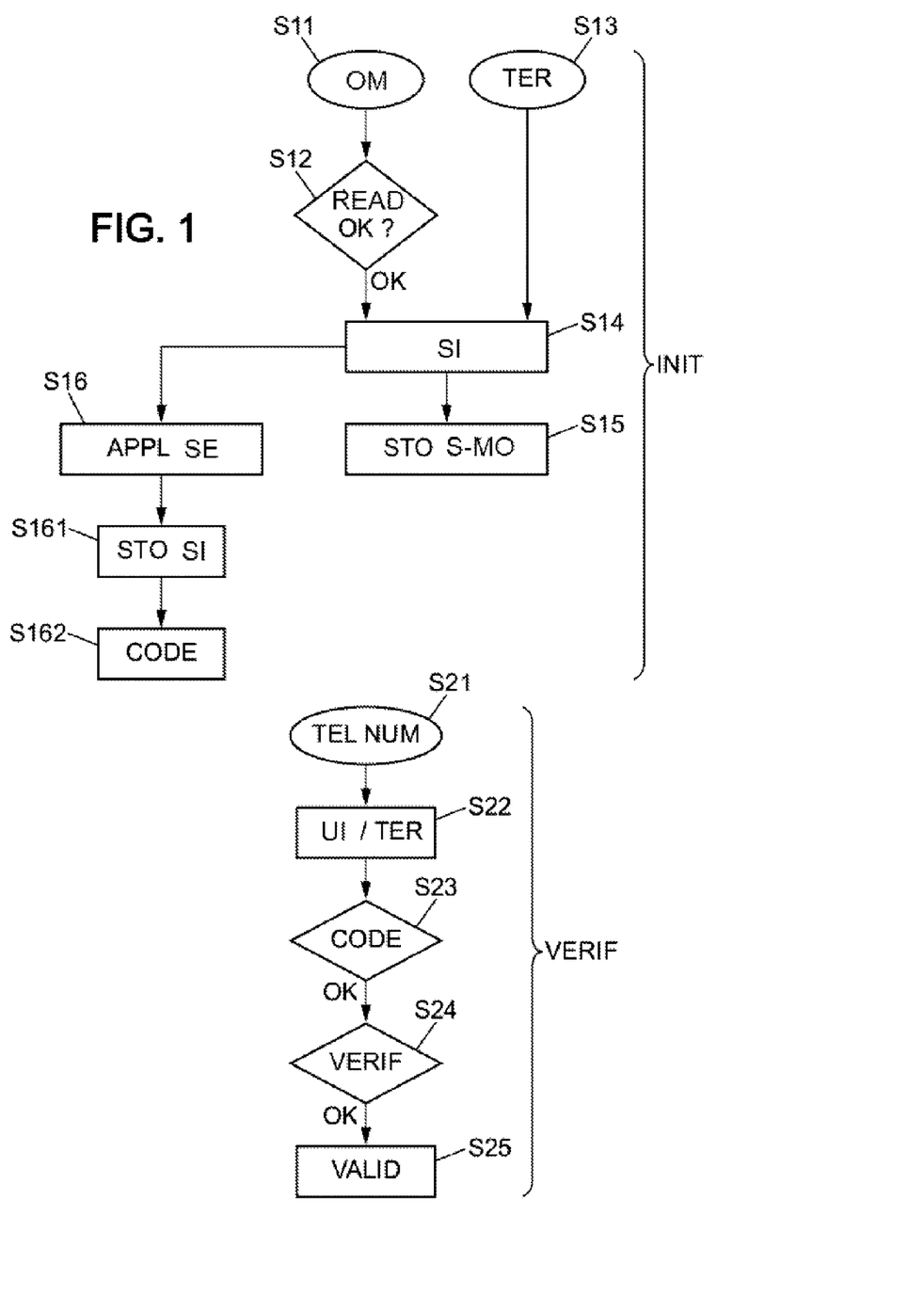
FIG. 1 schematically illustrates the main steps of the method of the invention.

The invention also relates to a computer program, comprising instructions for implementing the above method when this program is executed by a processor. FIG. 1, described below, can then represent the flowchart of the general algorithm of an example embodiment of this program.

The invention also relates to a terminal for implementing a method for verifying an identity of a user, comprising:

storage means for storing an identity derived from at least one authentic identity data item of the user in correspondence with a data item specific to the user, and computer program instructions which, when said instructions are executed by a processor of the terminal when so requested by a remote entity for verifying said derived identity:

cause a user interface to ask the user to enter said data item specific to the user, then verify the consistency between the entered specific data item and the stored specific data item, send the stored derived identity to the remote entity for verification.

The invention also relates to a verification entity for implementing at least the current step of said method, comprising means for:

contacting the terminal via said network, in order to cause the terminal to query the user, receiving and verifying the derived identity, received from the terminal, and if the verifications of the derived identity and of the data item specific to the user are positive, validating the verification of the user identity.

Of course, the invention also relates to a system comprising at least the terminal and the verification entity (remote from the terminal for example), and optionally the association module mentioned above.

The verification entity and the association module can be two separate entities (for example two servers remote from one another), or in a variant the association module can be integrated with the verification entity.

BRIEF DESCRIPTION OF THE DRAWINGS

Other features and advantages of the invention will be apparent upon examining the following detailed description, and the attached drawings in which.

DETAILED DESCRIPTION

Represented in FIG. 1 is an example embodiment of the succession of steps in a method of the invention, comprising an initial phase INIT of prior enrollment of the terminal, and a current step VERIF of verifying the identity of the user.

Figure 2:
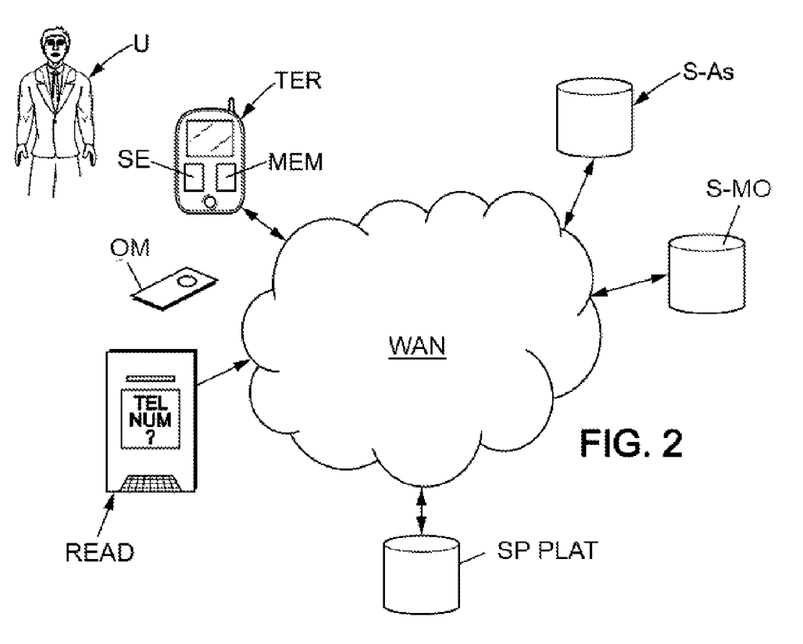
FIG. 2 illustrates a system for implementing the prior step of terminal enrollment.

In this example embodiment, during the prior phase INIT, in step S13 the user of a terminal TER (represented in FIGS. 2 and 3) sends to an association module S-As, remote from the terminal, a terminal data item, for example a telephone number for the terminal, with, in step S11, identity information concerning the user for example contained in an original medium OM. For this purpose, the user can make use of a terminal that reads the original medium. In step S12, the association module (for example an association server S-As represented in FIG. 2) can verify the identity information concerning the user and received from the read terminal, in an identity management module (for example a server S-MO for managing the media OM). In case of a positive verification (the OK arrow from the S12 test), the association module determines a derived identity SI in step S14, and communicates this derived identity to the terminal in step S16, in order to launch an application on the terminal (for example a cardlet application on the SIM card of the terminal), in particular in order to store the derived identity in step S161 in the memory of the security element of the terminal (for example its SIM card). The data of this application can be sent by an OTA (Over The Air) technique or by downloading from a URL link, or by some other technique. The execution of this application on the terminal can additionally consist of presenting an interface to the user in step S161, in order to store a data item specific to the user, for example in the form of a code specific to the user. In addition, in step S15, the association information associating the derived identity IS and the original identity can be sent to a platform for storage, this platform being managed for example by the module for managing the original medium S-MO.

Example embodiments will now be described in more detail, with reference to FIG. 2 which represents various entities involved in the first initialization phase INIT; these various entities are connected by a wide-area network (for example the Internet).

The first phase INIT is executed to generate a secondary identity IS:
- derived from an original identity OI, stored for example by an original medium OM, and,
- intended to be placed in a security element SE of the terminal TER (for example stored in the memory of a security component of the communicating mobile terminal, such as a SIM (Subscriber Identity Module) card).

The association of the identities occurs in the presence of two media:
- the original identity medium OM, and
- the security element SE of the terminal, to be associated.

As an example, the original medium OM may advantageously be, in the context of secure transmission of medical information, a SESAM-VITALE card or a CPS card (Carte de Professionnel de Santé—Healthcard Professional Card). However, more generally, the original medium may be a proof of identity document, a rights management document, or a security element providing verifiable information concerning its bearer. Typically, the SESAM-VITALE card or the CPS card provide several elements related to the identity of the bearer and his associated rights.

The association of two media takes place as follows, in one possible example embodiment.

In said step S11, the user U is connected to an association service (for example a hosted web application), on an association server S-As where he is identified/authenticated using the original identity medium OM.

For this purpose, the user U can use a reader READ for the original medium OM (either integrated into a device DEV such as a computer, or connected to this device DEV via a USB port), or a health card reader, a bank card reader, or other. However, he must also have a communicating terminal TER (telephone, smart phone, tablet, or other) providing a security element SE (SIM card or other), which is subsequently identified as a future recipient of secondary identity data SI.

The association server S-As reads or obtains from a reader the data from the original medium, including data relative to the original identity OI of the bearer of the original medium OM, provided for the transfer and later generation of a derived identity SI. It should be noted here, however, that a variant embodiment consists of pre-installing an application on the terminal TER, capable of generating itself the secondary identity data SI, for example after a near field (or NFC) reading of the card OM by the terminal. It can be arranged so that a close-proximity transfer (via a reader, a terminal, or an object) activates a contactless ISO14443 or NFC (near field) transaction for example.

In said step S12, the association server S-As can advantageously query a management server S-MO for the original medium OM in order to verify its validity. For example, the data issuing from the original medium can be sent by said reader READ, for example at the request of the association server S-As, to the management server S-MO in order to validate permissions and data (advantageously for fighting fraud and for verification of data integrity).

Once this verification is made, in step S13, the association server S-As requests, via an interface of the reader READ, the entry of a terminal data item (for example the telephone number, the SIM card id, or other) to allow later identification of the terminal TER and its association with the original medium OM.

If the reader READ does not have a data entry interface, the data entry interface of the device DEV can be used. It can be arranged so that during this same operation, data specific to the user U can be entered and stored in the memory of the terminal TER so the user can then have access to multiple means of self-identification, particularly at his personal terminal TER.

In one possible embodiment, in order to also verify that no error had been made in entering the terminal number TER, a secure message can be sent to the telephone number that the user entered, this message containing, for example, a request for user verification and acknowledgement of receipt (for example by clicking an OK in a popup window, performed by the user via the user interface of the terminal TER).

Then, in step S14, from the following two pieces of information received:
- the terminal data item (SIM card, telephone number of the terminal TER, or other),
- and the data from the original medium OM, including the original identity OI, the association server S-As generated at least one derived identity SI (and stores it in memory).

This derived identity SI can be a transformation and/or combination of the above two pieces of information, or simply a conversion of the original identity OI from the medium OM (for example using a hash function, encryption, or other means).

This derived identity SI can be in the form of an alphanumeric code of no particular significance, in order to guarantee anonymity and optimize the entropy of the secure solution.

In one embodiment, the association server S-As additionally generates a data item specific to the user, in the form of a personal code specific to the user (which can, for example, be redefined later by the user by personally entering new data). In a variant embodiment, the data item specific to the user is defined, chosen, and entered by the user.

This derived identity and this data item specific to the user are subsequently stored (in step S16 detailed below) in the terminal TER with reference to a personalized cardlet application (Java applet executed from a card) installed on the terminal. For this purpose, the invention also relates to a terminal comprising a memory MEM storing instructions for executing such an application. This application then takes charge of the exchanges of the terminal TER with a remote entity that performs identity verification, for subsequent services as described below.

In step S15, the derived identity is also sent to the management server for the original medium S-MO, which then stores in memory an association of the derived identity and the authentic identity of the user, in order to be able to find the original identity from the derived identity.

After the installation of said cardlet application on the terminal TER, step S16 saves the derived identity of this application in the secure memory of the security element SE. In one embodiment, the derived identity is sent from the association server S-As to, for example, a service provider platform SP PLAT of the telecommunications network that the terminal uses, this platform SP PLAT being in charge of then sending these to the user terminal TER. For example, this platform SP PLAT sends a secure message to the user terminal, which for example contains a hypertext link to the application and the derived identity, to be downloaded to the security element SE. When the user clicks on this link, the download and installation of the cardlet application for example in the SIM card of the terminal can start. Then the steps are executed of storing the derived identity SI in the memory of the security element SE of the terminal and presenting an interface to the user, for example in order to view a code defined by the association platform and which he can modify in order to personalize it.

Again with reference to FIG. 1, an example embodiment of the main steps of the current phase VERIF of identifying the user by his terminal is now described.

On a device DEV connected for a secure data transmission, the device DEV asks the user for the telephone number of the terminal via a user interface of the connected device, and the device sends this telephone number to a remote verification entity, in step S21.

This remote entity contacts the terminal to launch an application on the terminal, in step S22, initiating the operations of:
- asking the user to enter his personal code via a user interface of the terminal,
- and, in case of a successful verification of the code in step S23 by verifying the consistency between the personal code entered and the personal code stored in the storage means of the terminal or in the security element of this terminal, sending the derived identity from the terminal to the verification entity.

As one can see in the example embodiment described below with reference to FIG. 3, the verification entity can comprise several modules or servers that are remote from each other (including, in one embodiment, the association module S-As of FIG. 2).

In case of a successful verification of the derived identity at the verification entity in step S24, the verification entity validates the user identity verification in order to authorize the continued exchange of data between the device DEV and the service platform S-PLAT. For example, the service platform S-PLAT may receive validation status data from the verification entity for the verified identity (step S25), and upon receipt of this status data can generate a session key allocated for the communication with the device DEV. Additionally or alternatively, in order to further secure the data exchanges between the device DEV and the platform S-PLAT, the latter can generate a data encryption key (for example a derived key associated with the service). In effect, the data exchanged after the verification step can be confidential, and can for example involve medical data concerning the user. In yet another variant, the encryption key can be generated by the management server for the original medium S-MO.

Thus, after the phase of enrolling a terminal TER on the basis of an original medium OM, the identification/authentication of a user U is possible from this terminal TER in order to access an online service for example (or any application) requiring strong identification. Preferably, an access control layer linked to the application or to the service is used, its role being to protect the access to the application or to the service, as well as to manage the relations between the various authentication means.

Figure 3:
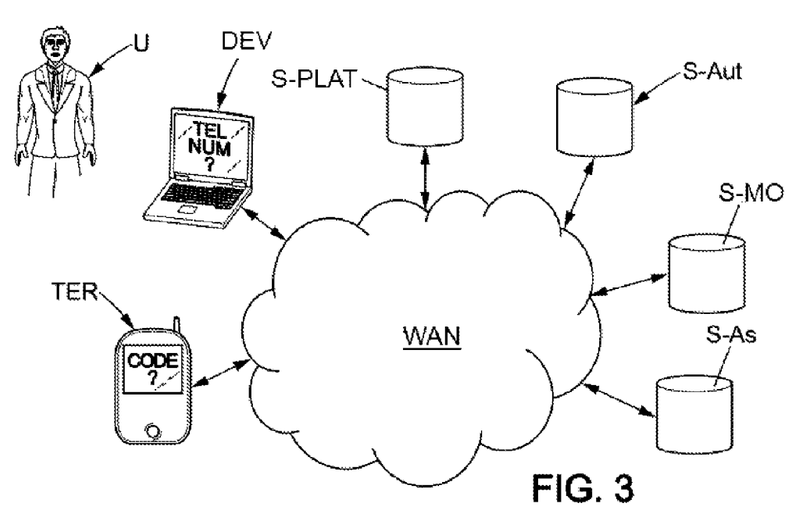
FIG. 3 illustrates a system for implementing the current step of identity verification.

With reference to FIG. 3, in said step S21, the user chooses one of the terminals available to him (telephone, tablet, computer, etc.) in order to communicate with a remote service platform S-PLAT, these terminals having of course been enrolled during an initialization phase as described above with reference to FIGS. 1 and 2.

Here, the terminal TER, which has a security element SE, is the vector for identification/authentication data, which avoids having to send sensitive information via the device DEV which could be the target or the direct source of an attack.

The service platform S-PLAT sends, by an appropriate software layer, a request for validation to an authentication server S-Aut.

The authentication server S-Aut contacts the terminal TER in order to execute, in step S22, a protected application on the terminal TER. This application presents the user with an interface for communication and data entry. More particularly, the authentication server S-Aut sends a request (secure message) to the security element of the terminal TER. This message is processed by the cardlet application in the security element SE of the terminal, installed during the initialization phase. The user is then asked in step S23 to provide a self-identification vector (for example the personal code of the user), for which the validity is verified locally on the terminal.

The user responds via the interface of the terminal TER by providing one of the self-identification vectors (for example said personal code) in order to continue the authentication operations.

If the proper vector was produced by the user U in step S23, the application in the security element SE sends a report of its success to the authentication server S-Aut, accompanied by the derived identity SI associated with the service.

The authentication server S-Aut then communicates the derived identity to the association server S-As, which verifies it, and if the derived identity is valid, then cooperates with the management server S-MO for the original identity, in order to verify, in step S24, the non-repudiation of the user identity and the validity of the rights associated with it. If applicable, the server S-MO returns a confirmation of the quality of the original identity associated with the user.

This validation information is then passed on from the authentication server S-Aut to the service platform S-PLAT, preferably via an access control software layer.

If the initial identity carried on the original medium is to be shared with a service platform, said platform preferably has, on the basis of information received, the approval of the user and a means of retrieving this information from the identity management server S-MO.

On the basis of the validation data, all transactions associated with this act can then be signed for example by a derived key (step S25). Each act can then be identified, thus providing a solution for auditing and repudiation management based on elements from all parts of the system.

This signature key can be generated by the service platform S-PLAT, or, as a variant, by the management server for the original medium S-MO (having access to technical tools for this purpose).

Of course, it is possible for a user to un-enroll from the service and to configure his terminal to this effect, or simply to change terminals and still retain access to the service via his new terminal.

For an un-enrollment initiated by the manager of the identity association service, the service provider can stop the identification functionalities of the terminal or more directly the functionalities provided during the service. It is preferable if the derived identity and possibly other personal information stored by the terminal are erased during this operation.

In addition, the rights manager can invalidate the services without requiring any modification of the information and applications stored in the terminal. When a user then attempts an access verification, the services are found to be inaccessible.

The user can un-enroll himself from a service or invalidate an association of his identity with a service. In this case, he can run an uninstall application on his terminal which, for example, can do the following:
  the user is identified,
  the ability to manage this right to un-enroll is verified on a platform,
  once the verifications are made, the identity verification application is uninstalled from the terminal and the references to the user on the remote server(s) are erased.

The service then no longer has any connection to the user, and the identifiers used lose their right of access to the service. If the user wants to use this service once again, he can of course redo the initial enrollment step.

The user can change his hardware medium. He can change his original identity medium OM or change the terminal containing his mobile identity. In both cases, the user can un-enroll for example from the service, then can redo the enrollment step for his terminal (a new terminal and/or the new original medium, whichever is applicable).

Thus the invention advantageously eliminates the need for a medium such as a smart card. For common applications, it allows using only a terminal, particularly a communicating mobile terminal. The invention advantageously can be applied to a patient needing to provide an authorization to send data from his medical records to a healthcare professional. For example, the healthcare professional can indicate via a connected device DEV that he wants to retrieve data concerning Mr. X. A message is displayed for example on the communicating terminal of Mr. X, asking if he authorizes the communication of his data to Dr. Y. If he answers "yes", he may be asked to enter his personal code and if this is successful the terminal sends the derived identity according to the above VERIF step.

However, in certain emergency situations, verification of the user code may not be necessary, for example for loading onto a user terminal basic data such as, for example, blood type, main allergies, etc.

Of course, in certain cases a terminal may contain multiple derived identities, in order to access different services or, for example, for family members who access a service (for example healthcare access for children who can be "identified" on the terminal of a parent).

Figure 4:
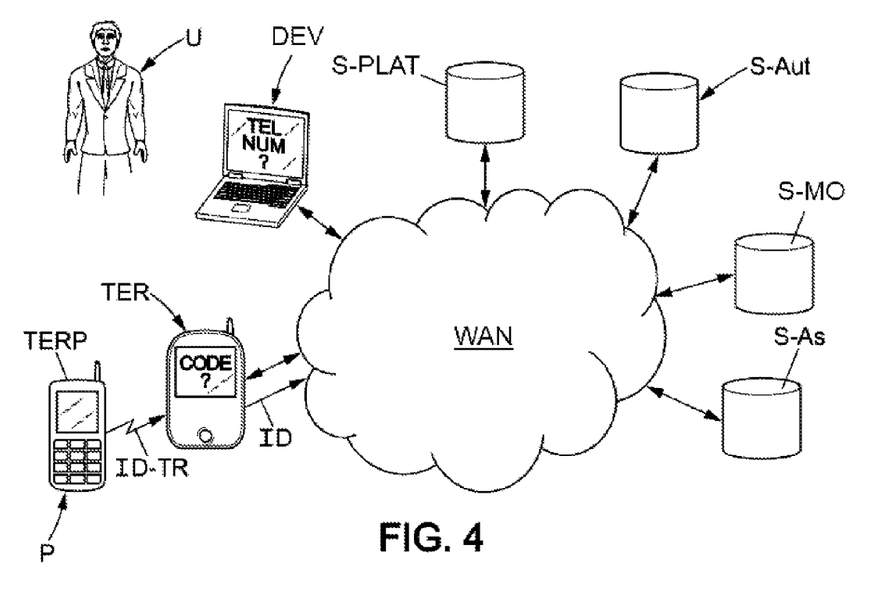
FIG. 4 illustrates an embodiment in which an identifier related to a service is sent by the terminal, in an example embodiment, in order to receive data related to the service.

The following is a description of an advantageous embodiment in the context of emergency services, with reference to FIG. 4. In such an embodiment, the terminal TER represented in FIG. 4 executes the same steps as those described above, a strong authentication again being used to ensure that the user U of the terminal TER is indeed the preregistered owner of the terminal. In the application described below as an illustration, the user U is an emergency medical responder, for example a healthcare professional, who needs to help a person P requiring emergency care. In the example described, the person requiring emergency care has a second terminal TERP. In this illustration, the person requiring care is unable to use his terminal himself. The emergency medical responder U then uses his own terminal TER for:
  obtaining an identifier ID specific to the person P, using the second terminal TERP in the example represented in FIG. 4,
  then identifying himself to a service platform S-PLAT, using the terminal TER, and
  sending the identifier ID specific to the person P and obtaining data about the person P in return, for example confidential data and/or data specific to the person, in this case medical data, usually confidential, for the person P requiring care and associated with the identifier ID.

For this purpose, the person P requiring care is preregistered for a service of the type described above. Said data for the person P may be stored for example in a personal space online or directly on a security element such as the SIM card of the terminal TERP (in which case a service platform is again involved for verifying the right to obtain data specific to the person P identified by the identifier ID, of the bearer of the terminal TER requesting this emergency service). The emergency medical responder U is therefore also enrolled in a service providing secure access to such data. Each terminal TER and TERP of the persons U and P contains an application installed for example on the SIM card in order to handle the operations described below as an example.

In the above case where the emergency medical responder U needs to access data specific to the person P, the terminal TER of the emergency medical responder U obtains access data for a service ID-TR, this access data being specific to the person P. This access data is obtained, in the example in FIG. 4, by interacting and/or communicating with the terminal TERP of the person P, for example by near field communication (NFC) between the terminal TERP and the terminal TER. Other embodiments are of course possible. This may involve reading an optical code (for example a quick response code) on a motorcycle helmet or a vehicle belonging to the person P. It could also involve reading an NFC label or RFID chip provided for this application.

From the access data ID-TR obtained on the terminal TER, the terminal TER obtains:
  optionally, an address of an emergency service platform S-PLAT to which the emergency medical responder U can then connect with his terminal TER, and
  an identifier ID specific to the person P, for example an identifier of his terminal TERP (MSISDN identifier for example) or a subscriber number, or an identifier specific to the emergency service, via which the person P is registered with the service platform as having requested the emergency service which allows providing the data to the requesting person.

The identifier and/or the address of the service platform are:
  either encoded in the access data ID-TR, and in this case are obtained by the terminal TER by decoding this access data ID-TR; this encoding/decoding may involve encryption/decryption;
  obtained by the terminal TER by sending a request to the emergency service platform containing this access data ID-TR, and obtaining the identifier ID and/or the address of the service platform in return.

The processing of the access data ID-TR by the terminal TER then allows the terminal TER of the emergency medical responder to connect to the service platform with the obtained address in order to:
  send to the platform the identifier ID specific to the person P, to allow the platform to verify that the person P has indeed previously requested such emergency service and/or is subscribed to such a service,
  initiate the execution by the terminal TER of an identity verification of the emergency medical responder U using strong authentication, according to the method described above,
  and, if the verification is positive, send the data for the person P from the platform, for example confidential information about the person P which in this case is the medical data for the person P, to the emergency medical responder who needs them in order to give first aid (in this application, for example, medical data such as the blood group, allergies to certain anesthetics, contraindications because of other current medical treatments, or other data).

In addition, it is assumed in this application that the person P needing care is unable to use his terminal TERP, or to enter for example an access code to activate the terminal TERP (PIN code) and place a call. However, typically if the PIN code is not entered, on many terminals it is still possible to make calls to emergency numbers (often two or three digits). Thus, the emergency response worker can enter an emergency number on the terminal TERP of the person P and communicate with a emergency service platform in order to provide a personal identifier for the emergency response worker U. The platform will check its database to verify that the person P is requesting/subscribed to the emergency service, for example based on the calling number of the terminal TERP. The platform retrieves the subscriber number of the emergency response worker U from his personal identifier, and contacts the emergency care worker on his terminal TER to verify his identity by applying the above strong authentication step to the emergency response worker via his terminal TER. If this identity verification is positive, the platform then sends the medical data for the person P to the emergency response worker.

One will understand from these different variants that the service platform, upon receipt:
  of contact data for the terminal of the emergency medical responder U (for example a telephone number on his terminal TER), and
  of an identifier ID specific to the person P (for example an identifier ID serving to verify whether the person is enrolled with the service platform as having requested this service),
  performs an identity verification, using strong authentication, of the emergency medical responder U via his terminal TER (previously enrolled), and
  if the verification is positive, sends the data for the person P to the terminal of the emergency medical responder (or to any other communicating device DEV, as indicated above).

The principle of the invention can be generalized to the use of an identifier ID regarding a service not necessarily specific to a person. This identifier ID is sent with contact data for the terminal TER via the network to which the terminal is connected (typically the service platform S-PLAT), and, if the identity verification for the user U is subsequently validated at the terminal TER, the user can then receive at least some informational data as a function of the service identifier ID sent (for example medical data for the person P on his terminal TER, when the identifier ID regarding the service is also specific to the person). The identifier ID is thus representative of a set of informational data to be sent and it therefore allows the service platform to select, identify, and obtain the informational data to be sent to the terminal TER. In addition, one or more identifiers ID can be associated with the same person P, each identifying a different set of informational data: for example, a medical data set, a bank data set, etc. Thus different applications of the invention can be envisaged which depend on the content of the set of informational data sent.

In one particular embodiment, the terminal TER can then:
  read the identifier ID by interacting with a communicating object (the terminal TERP of the person P, or an RFID label, or a quick response code which can be considered in these generic terms as a communicating object), and
  send the identifier ID in order to receive, after such a send and upon validation of the identity verification, said informational data as a function of the identifier ID.

However, as described above, the identifier ID can be sent directly from the terminal TERP of the person P, with for example access data for a service which additionally contain an encoded link to a service platform.

Thus, in one particular embodiment, the terminal TER receives access data for a service which encode the identifier ID, by interacting with an object (quick response code label for example). This object can be a communicating object (RFID tag, or mobile terminal using NFC interactions). In this particular embodiment, the access data for a service ID-TR allow the terminal TER to obtain the address of the service platform and the identifier ID.

The terminal TER then sends the service identifier ID to the service platform, in order to receive, subsequent to this transmission and if the verification in the current step of identity verification is successful, the informational data as a function of the identifier ID sent.

In the example embodiment of FIG. 4, said communicating object is a second terminal TERP, able to communicate with the first terminal TER enrolled during the prior enrollment step. For example, the first terminal TER receives the identifier ID of the second terminal TERP by near field communication with the second terminal, which is advantageous particularly in cases where the second terminal TERP belongs to a person P requiring emergency care and unable to use his terminal TERP, and where the first terminal TER belongs to an emergency medical responder U.

The reading of the access data for a service ID-TR on the first terminal TER initiates the connection of the terminal TER of the emergency medical responder to the service platform, to which the terminal TER sends contact data for the terminal TER (for example its subscriber number) and the identifier ID (for example the subscriber number of the terminal TERP if the two terminals TER and TERP have interacted).

When the identity of the user of the terminal TER has been verified by the service platform, the service platform verifies, for example by retrieving a user profile associated with the authenticated user (defining one or more user categories to which the authenticated user belongs, for example: healthcare professional, firefighter, or other), whether at least one of the user categories defined in the user profile is authorized to access the informational data identified by the identifier ID. If the identifier ID is specific to a person P, the service platform verifies whether the user of the terminal TER is authorized to access the data for this person P.

In one example embodiment, the platform additionally validates a non-repudiation of the service by the person P (verifying that no loss or theft of the terminal TERP has been reported, or other validation).

The service platform additionally requests from the authentication service a strong authentication of the emergency medical responder U, via for example the authentication server S-Aut of FIG. 4. For this purpose, the emergency medical responder is asked to enter personal information on his mobile terminal. As described above, service platforms that store associations S-As and/or manage the original identity S-MO may optionally be consulted when needed. If the presumed emergency medical responder is authenticated, but the derived identity passed on to the platform does not correspond to a type of identity authorized to access the data of the person P, the emergency medical responder's access is refused.

In addition, it can be arranged so that the terminal TERP of the person P is enrolled beforehand in this emergency service (via his security element, for example his SIM card). For example, if the emergency medical responder was authenticated successfully and he has one of the identities authorized to access the informational data as a function of the identifier ID, the service platform can for example send a secure message (for example an SMS message) to the terminal TERP, to activate the security element of the terminal TERP. It may, for example, execute a routine on the terminal TERP that verifies the enrollment of the terminal TERP, for example by verifying an identifier (or a private key) stored in the SIM card. In such an embodiment, after this verification, informational data can be displayed by the terminal TERP.

In one variant, it can be arranged so that the terminal TER is sent a key, which may be a key for one-time use, allowing the user U of the terminal TER to access the informational data via a storage platform. For example, the service platform can send a request to the storage platform, authorizing access to the informational data which are then displayed for the user U of the terminal TER in a browser on his terminal TER for example.

An application of such an embodiment to emergencies was described above, particularly to medical emergencies. Other applications are of course possible. For example, there can be an application in which the identity of a child and the person accompanying the child is verified by applying the embodiment described with reference to FIG. 4. In such an application, a service platform verifies the identity of the person accompanying the child by strong authentication on the terminal of said person. Other applications are also possible: for example having the terminal TER read a quick response code in order to gain the right to a particular service (entry to a film, a play, or other). In such an application, the quick response code when read allows connecting to a platform with a service identifier, and after the identity of the bearer of the terminal TER is validated, the bearer can access the service.

Of course, the invention is not limited to the embodiment described above as an example. It extends to other variants.

For example, a plurality of servers and a platform for implementing the current verification step were described above. In one possible embodiment, these different elements can be grouped together in the same service platform for example.

Also, receiving the derived identity at the terminal at the end of the initial enrollment phase was described above. However, a variant could consist of executing a preexisting application on the terminal to generate the derived identity and store it in relation to a given service, then possibly communicating it to an association server related to the service.

The invention claimed is:

1. A method for verifying an identity of a user, wherein the method comprises:
   a prior step of enrolling a terminal of the user, comprising reading, using a reader distinct from the terminal, a security component of an identity medium of the user so as to provide at least one authentic identity data item of the user, the identity medium being external to the terminal, and
   storing an identity derived from said at least one authentic identity data item, in storage means of the terminal, in correspondence with a data item specific to the user, and
   a current step of verifying the identity of the user at the terminal, comprising a strong authentication based on the stored derived identity and on the stored data item specific to the user.

2. The method of claim 1, wherein the prior enrollment step comprises a determination of the derived identity by combining:
   the authentic identity data item of the user, and
   a terminal data item.

3. The method of claim 2, wherein the storing of associations is implemented in an association module, remote from the terminal.

4. The method of claim 1, wherein the prior enrollment step comprises an association between:
the authentic identity data item of the user, and
a terminal data item,
said association being stored with data for contacting the terminal via a network to which the terminal is connected.

5. The method of claim 1, wherein the current verification step comprises:
a verification of consistency between the stored data item specific to the user and a data item specific to the user entered by the user by means of the terminal, and
a transmission of the derived identity stored in the terminal to a remote verification entity.

6. The method of claim 1, wherein the current step of verifying the identity of the user comprises:
using the data for contacting the terminal via a network to which the terminal is connected, a contacting of the terminal via this network to cause the terminal to ask the user to enter said data item specific to the user,
a verification by the terminal of said entered data item specific to the user,
if the verification of the entered data item specific to the user is positive, a verification of the stored derived identity,
and, if the verification of the derived identity is positive, a validation of the verification of the user identity.

7. The method of claim 1, wherein said derived identity is stored in storage means of a security element of the terminal.

8. The method of claim 1, wherein the derived identity is sent to the terminal by an Over the Air technique together with data of an application running on the terminal in order to at least control the storing of the derived identity.

9. The method of claim 8, wherein the derived identity is transmitted via a platform of a provider of a communication network to which the terminal is connected.

10. The method of claim 1, wherein, during said current step, the derived identity is sent from the terminal to a verification entity remote from the terminal and is verified by said entity, the verification of the derived identity being validated at said entity if the data item specific to the user was also verified successfully by the terminal.

11. The method of claim 1,
wherein the prior enrollment step comprises a determination of the derived identity by combining:
the authentic identity data item of the user, and
a terminal data item, and
wherein the storing of associations is implemented in an association module, remote from the terminal, and
wherein during said current step, the derived identity is sent from the terminal to a verification entity remote from the terminal and is verified by said entity, the verification of the derived identity being validated at said entity if the data item specific to the user was also verified successfully by the terminal, and
wherein the remote entity comprises an authentication module cooperating with at least said association module in order to verify the derived identity received from the terminal during the current step.

12. The method of claim 11, wherein:
during said prior step:
the terminal sends to an association module remote from the terminal, a terminal data item with the authentic identity data item of the user,
the association module determines a derived identity, and communicates said derived identity to the terminal,
upon receipt of the derived identity, the terminal executes an application:
to store the derived identity and
to present an interface to the user, for registering a data item specific to the user, during said current step:
on a device connected for a secure transmission of data, the device asks the user for contact data for the terminal via a user interface of the connected device, and the device sends said contact data to a verification entity that is remote from the terminal,
the remote verification entity contacts the terminal in order to launch an application on the terminal, initiating operations:
asking the user to enter the data item specific to the user via a user interface of the terminal, and
if the verification of the data item specific to the user is positive, sending the derived identity from the terminal to the verification entity,
in case of successful verification of the derived identity at the verification entity, the verification entity validates the verification of the user identity in order to authorize a data transmission via the connected device.

13. The method of claim 12, wherein, during said prior step:
the association module verifies said identity information with an identity management module, and
if the verification is positive, the association module determines a derived identity and communicates said derived identity to the terminal.

14. The method of claim 1, wherein an identifier is sent with data for contacting the terminal via a network, to a service platform, and if the identity verification is positive in the current step, the user is authorized to access informational data as a function of said identifier.

15. The method of claim 14, wherein the terminal receives, by interaction with a communicating object, service access data encoding said identifier.

16. The method of claim 15, wherein the communicating object is a second terminal available to a second user, and able to communicate with the first terminal enrolled during said prior step.

17. The method of claim 14, wherein the informational data contain at least data specific to a user of the communicating object.

18. The method of claim 14, wherein said identifier is sent to a service platform, and said service platform verifies said identifier and authorizes an access to said informational data if the verification of said identifier is positive.

19. A method for ensuring the security of a data transmission between a device and a service platform, comprising a verification of the identity of a user of the device according to said current step of the method of claim 1, the method for ensuring the security comprising:
a sending of contact data for the terminal to the service platform,
the execution of the current step of identity verification, from the terminal of the user, and
if the identity verification is positive, a step authorizing a data transmission between the device and the service platform.

20. A non-transitory computer readable medium storage, with a computer program stored thereon, wherein the computer program comprises instructions for implementing the method according to claim 1, when this program is executed by a processor.

21. A verification system for implementing at least the current step of the method of claim 1, comprising means for:
   contacting the terminal via said network, in order to cause the terminal to query the user,
   receiving and verifying the derived identity, received from the terminal, and
   if the verifications of the derived identity and of the data item specific to the user are positive, validating the verification of the user identity.

22. A terminal for implementing a method for verifying an identity of a user, wherein the terminal comprises:
   storage means for storing an identity derived from at least one authentic identity data item of the user in correspondence with a data item specific to the user, said at least one authentic identity data item of the user is being provided, using a reader distinct from the terminal, by reading a security component of an identity medium of the user, the identity medium being external to the terminal, and
   computer program instructions which, when said instructions are executed by a processor of the terminal when so requested by a remote entity for verifying said derived identity:
      cause a user interface to ask the user to enter said data item specific to the user, then verify the consistency between said entered specific data item and the stored specific data item,
   send the stored derived identity to the remote entity for verification.

* * * * *